US009645050B2

(12) United States Patent
Allford

(10) Patent No.: US 9,645,050 B2
(45) Date of Patent: May 9, 2017

(54) ACTUATION SYSTEM INVESTIGATION APPARATUS

(71) Applicant: ROLLS-ROYCE PLC, London (GB)

(72) Inventor: Peter Allford, Alveston (GB)

(73) Assignee: Rolls-Royce plc, London (GB)

( * ) Notice: Subject to any disclaimer, the term of this patent is extended or adjusted under 35 U.S.C. 154(b) by 308 days.

(21) Appl. No.: 14/638,569

(22) Filed: Mar. 4, 2015

(65) Prior Publication Data

US 2015/0276553 A1    Oct. 1, 2015

(30) Foreign Application Priority Data

Mar. 28, 2014 (GB) .................................. 1405572.7

(51) Int. Cl.
*G01M 15/14* (2006.01)
*F01D 21/00* (2006.01)
(Continued)

(52) U.S. Cl.
CPC ............ *G01M 15/14* (2013.01); *F01D 17/16* (2013.01); *F01D 21/003* (2013.01);
(Continued)

(58) Field of Classification Search
CPC ..... G01M 15/14; G01M 13/027; F01D 17/16; F05D 2260/83; A01B 12/006
(Continued)

(56) References Cited

U.S. PATENT DOCUMENTS 2,340,505 A * 2/1944 Beed ................... G01M 5/0016
                                                                73/798
3,690,160 A * 9/1972 Kriesten ............... G01M 13/00
                                                                73/831
(Continued)

FOREIGN PATENT DOCUMENTS

GB         2496984 A      5/2013
JP         H03-42545 A    2/1991

OTHER PUBLICATIONS

Aug. 27, 2015 Search Report issued in European Patent Application No. 15 15 7617.
(Continued)

*Primary Examiner* — Michael A Lyons
*Assistant Examiner* — Alexander Mercado
(74) *Attorney, Agent, or Firm* — Oliff PLC

(57) ABSTRACT

An apparatus for investigating mechanical operational characteristics of a gas turbine variable vane actuation system includes coaxial inner and outer annular casings corresponding to inner and outer casings of a gas turbine engine. The apparatus includes a circumferential row of vane substitutes, each extending between an inner end at the inner casing and an outer end at the outer casing, and rotatable about an axis extending through its ends to emulate the rotation of a variable vane in the engine. The apparatus includes respective loading devices for the vane substitutes, each applying a mechanical load to its vane substitute between the inner and outer ends as the vane substitute rotates to emulate the aerodynamic loading on a variable vane in the engine and to (Continued)

generate resulting frictional loading at the inner and outer ends which emulates resulting the frictional loading at the ends of the variable vane in the engine.

8 Claims, 3 Drawing Sheets

(51) Int. Cl.
    *F04D 27/00*     (2006.01)
    *F04D 27/02*     (2006.01)
    *F04D 29/56*     (2006.01)
    *F01D 25/28*     (2006.01)
    *G01M 13/02*     (2006.01)
    *F01D 17/16*     (2006.01)

(52) U.S. Cl.
    CPC ......... *F01D 25/285* (2013.01); *F04D 27/001* (2013.01); *F04D 27/0246* (2013.01); *F04D 29/563* (2013.01); *G01M 13/027* (2013.01); *F05D 2260/83* (2013.01)

(58) Field of Classification Search
    USPC ........................................................ 73/112.01
    See application file for complete search history.

(56) References Cited

U.S. PATENT DOCUMENTS

| | | | | |
|---|---|---|---|---|
| 4,019,375 A * | 4/1977 | Ellis | .................. | G01M 7/00 |
| | | | | 73/583 |
| 4,453,413 A * | 6/1984 | Schneider | ............. | G01M 5/005 |
| | | | | 73/802 |
| 5,314,307 A * | 5/1994 | Farmer | ................. | F01D 21/045 |
| | | | | 416/2 |
| 6,250,166 B1 * | 6/2001 | Dingwell | ................. | G01N 3/32 |
| | | | | 73/808 |
| 7,689,376 B2 * | 3/2010 | Padhye | ................... | F02B 37/24 |
| | | | | 123/431 |
| 7,971,473 B1 * | 7/2011 | Meunier | ............... | G01M 15/14 |
| | | | | 73/112.01 |
| 8,430,623 B2 * | 4/2013 | Beckford | .................. | F01D 5/14 |
| | | | | 415/9 |
| 8,727,696 B2 * | 5/2014 | Cox | ........................ | F01D 17/10 |
| | | | | 29/407.05 |
| 2002/0162400 A1 * | 11/2002 | Xie | ........................... | G01N 3/32 |
| | | | | 73/812 |
| 2005/0079060 A1 * | 4/2005 | MacManus | ............. | F01D 5/141 |
| | | | | 416/235 |
| 2005/0268728 A1 * | 12/2005 | Phipps | ..................... | G01N 3/04 |
| | | | | 73/826 |
| 2010/0263453 A1 * | 10/2010 | Mason | ..................... | G01N 3/04 |
| | | | | 73/826 |
| 2011/0056300 A1 * | 3/2011 | Waggot | ................. | G01M 5/005 |
| | | | | 73/662 |
| 2013/0061683 A1 * | 3/2013 | Baker | ..................... | F03D 17/00 |
| | | | | 73/834 |
| 2013/0136575 A1 * | 5/2013 | Potel | ..................... | F01D 17/162 |
| | | | | 415/1 |
| 2014/0083208 A1 * | 3/2014 | Little | .................. | G01M 13/027 |
| | | | | 73/862.338 |
| 2014/0260573 A1 * | 9/2014 | Spanos | ................. | F04D 29/563 |
| | | | | 73/112.01 |
| 2015/0268144 A1 * | 9/2015 | Clark | .................. | G01M 5/0075 |
| | | | | 73/849 |
| 2016/0146194 A1 * | 5/2016 | Christiansen | ........... | F03D 17/00 |
| | | | | 73/788 |

OTHER PUBLICATIONS

Nov. 3, 2014 Search Report issued in British Patent Application No. 1405572.7.

\* cited by examiner

ACTUATION SYSTEM INVESTIGATION APPARATUS

FIELD OF THE INVENTION

The present invention relates to an apparatus for investigating mechanical operational characteristics of a gas turbine variable vane actuation system.

BACKGROUND OF THE INVENTION

With reference to FIG. 1, a ducted fan gas turbine engine is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

Each of the compressors 13, 14 typically has a row of inlet guide vanes and a plurality of compressor stages, each stage comprising a set of stator vanes which receive and redirect the working fluid issuing from the rotating blades of the preceding stage. As aero engines have to operate at varying speeds and inlet conditions, it can be advantageous to be able to alter the aerodynamic flow angle of individual inlet guide vanes and stator vanes within the gas turbine annulus, depending upon the present engine operating speed and conditions. Vanes whose flow angles are alterable in this way are known as variable vanes.

A large variety of systems are conventionally used to actuate variable vanes. For example, unison rings can be used to rotate variable vanes about their radial axes and thereby change the aerodynamic flow angle. Each unison ring encircles the engine and is rotated by one or more actuators to produce movement in the circumferential direction. This movement can be converted by an arrangement of levers and spindles into the rotation of the variable vanes.

When developing new variable vane actuation systems it can be desirable to determine levels of system hysteresis and movement accuracy. In this context, by "hysteresis" is meant the amount of actuator movement prior to producing an actual vane angular movement. The hysteresis is typically caused by system mechanical wind up generated via a combination of aerodynamic and frictional loading and also mechanical backlash at articulation joints.

One known approach for determining system hysteresis is to measure vane and actuator relative movements via potentiometers attached to certain variable vanes within the stage and to compare those measurements with that of the output of a linear transducer(s) positioned and attached to the actuator(s).

However, conventionally it is necessary to perform such determinations as part of a full engine test. This is a disadvantage in that, during engine development, access to engine test facilities may be limited and expensive.

SUMMARY OF THE INVENTION

Thus, in a first aspect, the present invention provides an apparatus for investigating mechanical operational characteristics of a gas turbine variable vane actuation system, the apparatus including:
  coaxial inner and outer annular casings corresponding to inner and outer casings of an actual gas turbine engine;
  a circumferential row of vane substitutes, each vane substitute extending between an inner end at the inner casing and an outer end at the outer casing, and being rotatable about an axis extending through its ends to emulate the rotation of a variable vane in the actual engine; and
  respective loading devices for the vane substitutes, each loading device applying a mechanical load to its vane substitute between the inner and outer ends thereof as the vane substitute rotates to emulate the aerodynamic loading on a variable vane in the actual engine and to generate resulting frictional loading at the inner and outer ends which emulates the resulting frictional loading at the ends of the variable vane in the actual engine; and
  wherein the apparatus is configured to be fitted with a variable vane actuation system of the actual engine, the actuation system, when fitted and operated, rotating the vane substitutes such that the vane substitutes are loaded by the loading devices.

Advantageously, the apparatus facilitates investigation of variable vane actuation systems by avoiding the need for full engine testing. In particular, because the vane substitutes are mechanically loaded, there is no need to generate a representative flow field within the apparatus. In use, the vane substitutes and the actuation system may be instrumented (e.g. with potentiometers and transducers) as per a conventional engine test to measure system hysteresis and vane movement accuracy.

In a second aspect, the present invention provides an apparatus according to first aspect fitted with a variable vane actuation system of an actual engine. For example, the actuation system can include any one or any combination of: a unison ring, actuators, levers and bushing/bearing arrangements.

In a third aspect, the present invention provides the use of the apparatus of the first aspect for investigating mechanical operational characteristics of a gas turbine variable vane actuation system. For example, a method of investigating mechanical operational characteristics of a gas turbine variable vane actuation system includes: providing the apparatus of the first aspect; fitting the apparatus with a variable vane actuation system of an actual engine; instrumenting the apparatus and the actuation system; and measuring actuation system hysteresis and/or variable vane movement accuracy using the instrumented apparatus and actuation system. The measuring may be performed at different temperature by heating and/or cooling the instrumented apparatus and actuation system, thereby emulating the temperatures experienced in practice by the gas turbine and its actuation system.

Optional features of the invention will now be set out. These are applicable singly or in any combination with any aspect of the invention.

Preferably the inner and outer ends of the vane substitutes are mounted to respectively the inner and outer casings in a similar or identical way to mountings of the vanes to the casings in the actual engine. This helps to ensure that the resulting frictional loading at the ends properly emulates that at the ends of the variable vanes in the actual engine.

Conveniently, each loading device may have a Gemming mechanism to vary the applied mechanical load as the vane substitute rotates. Such mechanisms can be easily adjusted (e.g. by suitable shimming) to emulate different aerodynamic loadings. The camming mechanism can include a cam provided by the respective vane substitute, and a cam track provided by a static loading member, wherein rotation of the vane substitute causes rotation of the cam such that the cam track exerts a load on the vane substitute via the cam, the load varying with the rotational position of the vane substitute. Shimming to emulate different aerodynamic loadings can be introduced at the cam track. The cam may be at about midway between the inner and outer ends of the vane substitute. Although this will introduce a different (relatively focused) loading distribution on the vane substitute compared with aerodynamic loading on a variable vane in the actual engine, which is more evenly distributed over the length of the vane, by suitably configuring the vane substitute and the cam mechanism, the amount of bowing and reactive end loading produced by the loading can closely match that experienced by a variable vane in the actual engine. Conveniently, the camming mechanism can further include a support ring, e.g. coaxial with the casings, which supports the cam tracks.

The vane substitutes may be spindle-shaped. There is no need to make the vane substitutes as aerofoils.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES OF THE INVENTION

Figure 1:
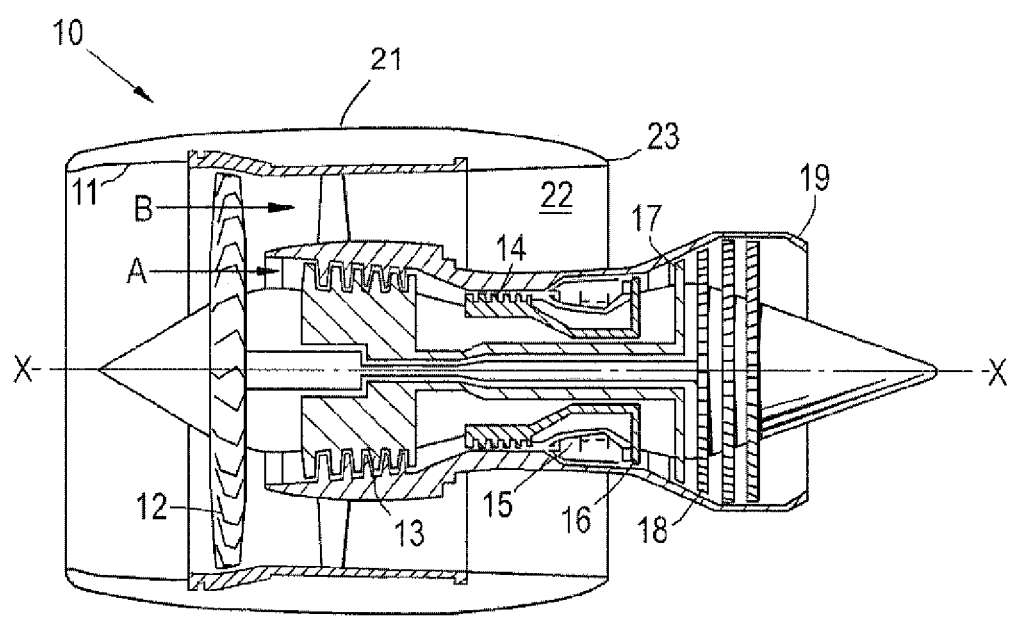
FIG. 1 shows schematically a longitudinal section through a ducted fan gas turbine engine.
Figure 2:
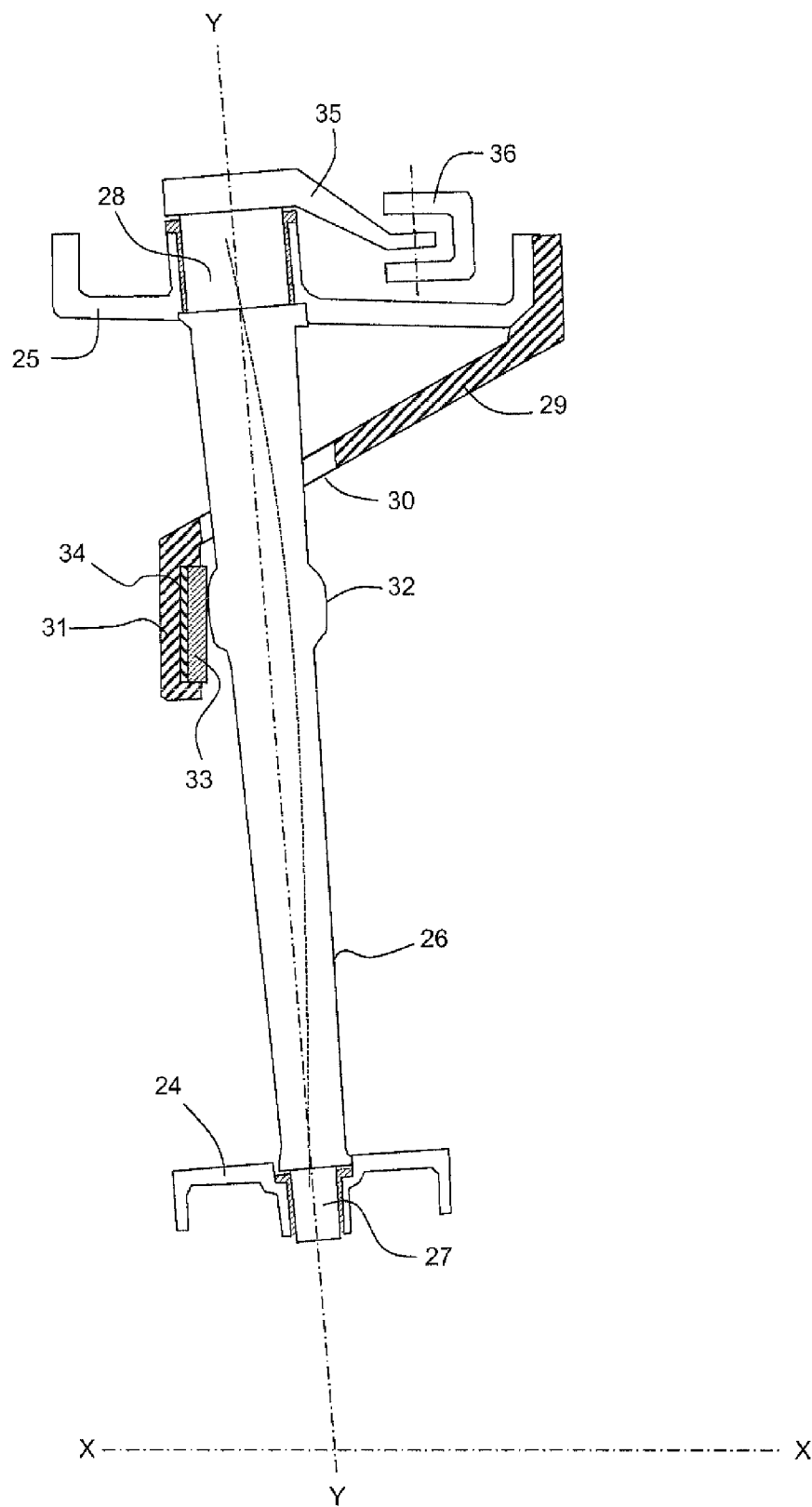
FIG. 2 shows schematically a longitudinal section through an apparatus for investigating mechanical operational characteristics of a gas turbine variable vane actuation system.

FIG. 2 shows schematically a longitudinal section through an apparatus for investigating mechanical operational characteristics of a gas turbine variable vane actuation system.

The apparatus has inner 24 and outer 25 casings coaxial with a centre line X-X corresponding to the centre line of an actual gas turbine engine, the casings corresponding to the inner and outer casings of the engine.

A circumferential row of vane substitutes 26, each in the form of a spindle, extends between the casings 24, 25. Each spindle is rotatable about an axis Y-Y extending through its inner 27 and outer 28 ends. The inner end 27 is mounted to the inner casing 24 and the outer end 28 is mounted to the outer casing 25 in the same way that a variable vane is rotatably mounted to the inner and outer casings of the actual engine.

The apparatus further has a support ring 29 mounted to the outer casing 25 and coaxial with the casings 24, 25. The spindles 26 pass through respective holes 30 in the ring, which terminate radially inwardly at a mounting flange 31. Each spindle has an integral cam 32 positioned at approximately its mid-span position, and a respective cam track 33 held at the mounting flange. The precise axial position of the cam track relative to the cam can be adjusted by means of a shim 34 inserted between the mounting flange and the track.

A vane actuation system to be investigated is fitted to the apparatus. In FIG. 2, the system is represented by a lever 35 joined to the outer end 28 of each spindle 26, and a unison ring 36 which is pivotally connected to the levers of all the spindles and which can be rotated about the centre line X-X to turn the levers and thereby rotate the spindles about their axes Y-Y. However, the actuation system can be variously configured with different components and, indeed, a purpose of the apparatus is to facilitate the investigation of differently configured systems.

Figure 3:
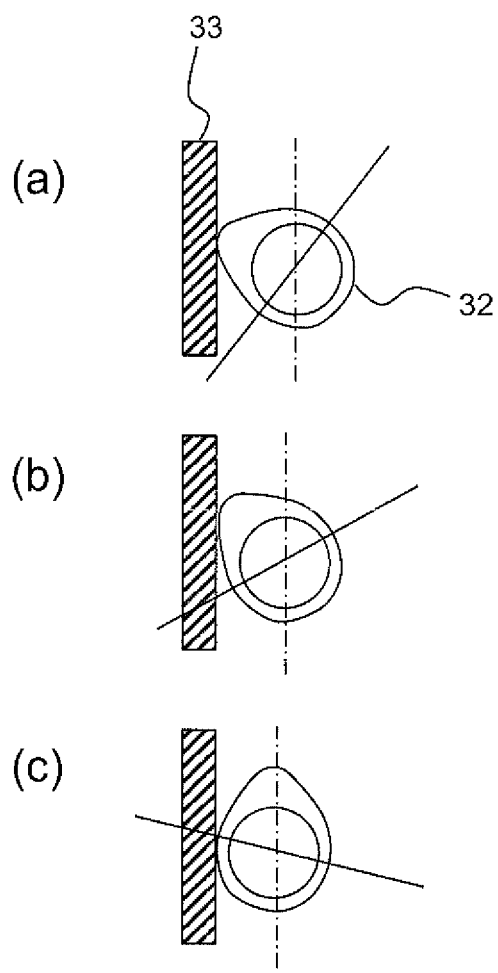
FIG. 3 shows progressive rotational positions (a) to (c) of a cam and cam track forming a loading device for a vane substitute of the apparatus of FIG. 2, the positions (a) to (c) corresponding respectively to fully closed, partially closed and fully open vane positions.

The cams 32 and cam tracks 33 form loading devices for the spindles 26. FIG. 3 shows progressive rotational positions (a) to (c) of the cam relative to the cam track. In the fully closed position (a), the spindle is maximally loaded, and assumes a bowed shape, indicated with a dotted line in FIG. 2, Correspondingly, in the actual engine, the fully closed vane position is the position of maximum aerodynamic loading. Then, in positions (b) and (c) progressive rotation of the spindle reduces the loading, and hence the bowing, these positions corresponding to respectively partially closed and fully open vane positions in the actual engine.

By appropriate shaping of the cams 32 and shimming of the cam tracks 33, the effects of loading of the spindles 26 can thus be made to closely match the effects of the aerodynamic loading of the vanes in the actual engine. In particular, the overall resistance to rotation can be matched, and the amount of bowing can be matched. In this way, it does not matter that the actual aerodynamic load may be applied in a different way (e.g. with a more uniform distribution across the vane span). As far as the actuation system is concerned, the rotating spindles are essentially indistinguishable from the rotating vanes in the sense that they emulate the aerodynamic loading on a variable vane in the actual engine and generate resulting frictional loading at the inner 27 and 28 outer ends which emulates resulting the frictional loading at the ends of the variable vane. These loadings then produce actuation system hysteresis effects which are the same as those seen during operation of the actual engine.

Thus, with the spindles 26 and actuation system appropriately instrumented (e.g. with potentiometers and transducers), the apparatus allows the measurement of actuation system hysteresis and/or variable vane movement accuracy without the need to perform full engine tests. The apparatus can also be heated or cooled to different temperatures to make measurements corresponding to different operating conditions of the engine. In particular, higher temperatures may result in a thermal pinch point of components, particularly during rapid acceleration of the engine (e.g. unison ring to casing and/or spindle/bush/casing thermal pinching). Similar situations may also potentially arise during sub-zero temperature conditions. The apparatus may therefore be utilised in cold as well as hot climatic chambers to better understand the thermal characteristics of the actuation system.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. An apparatus for investigating mechanical operational characteristics of a gas turbine variable vane actuation system, the apparatus including:
    coaxial inner and outer annular casings corresponding to inner and outer casings of an actual gas turbine engine;
    a circumferential row of vane substitutes, each vane substitute extending between an inner end at the inner casing and an outer end at the outer casing, and being rotatable about an axis extending through its ends to emulate the rotation of a variable vane in the actual engine; and
    respective loading devices for the vane substitutes, each loading device applying a mechanical load to its vane substitute between the inner and outer ends thereof as the vane substitute rotates to emulate the aerodynamic loading on a variable vane in the actual engine and to generate resulting frictional loading at the inner and outer ends which emulates the resulting frictional loading at the ends of the variable vane in the actual engine; and
    wherein the apparatus is configured to be fitted with a variable vane actuation system of the actual engine, the actuation system, when fitted and operated, rotating the vane substitutes such that the vane substitutes are loaded by the loading devices.

2. An apparatus according to claim 1, wherein each loading device has a camming mechanism to vary the applied mechanical load as the vane substitute rotates.

3. An apparatus according to claim 2, wherein the camming mechanism includes a cam provided by the respective vane substitute, and a cam track provided by a static loading member, wherein rotation of the vane substitute causes rotation of the cam such that the cam track exerts a load on the vane substitute via the cam, the load varying with the rotational position of the vane substitute.

4. An apparatus according to claim 3, wherein the cam is at about midway between the inner and outer ends of the vane substitute.

5. An apparatus according to claim 3, wherein the camming mechanism further includes a support ring which supports the cam tracks.

6. An apparatus according to claim 1, wherein the vane substitutes are spindle-shaped.

7. An apparatus according to claim 1 fitted with a variable vane actuation system of an actual engine.

8. An apparatus according to claim 7, wherein the variable vane actuation system includes any one or any combination of: a unison ring, actuators, levers and bushing/bearing arrangements.

* * * * *